United States Patent
Ishima et al.

(10) Patent No.: US 7,322,643 B2
(45) Date of Patent: Jan. 29, 2008

(54) VEHICLE SEAT

(75) Inventors: Shinya Ishima, Tochigi (JP); Masaki Nagayama, Tochigi (JP)

(73) Assignee: TS Tech Co., Ltd., Asaka-Shi (JP)

( * ) Notice: Subject to any disclaimer, the term of this patent is extended or adjusted under 35 U.S.C. 154(b) by 261 days.

(21) Appl. No.: 11/091,388

(22) Filed: Mar. 29, 2005

(65) Prior Publication Data
US 2005/0243331 A1    Nov. 3, 2005

(30) Foreign Application Priority Data

| Mar. 31, 2004 | (JP) | ............................ 2004-102594 |
| Mar. 31, 2004 | (JP) | ............................ 2004-102601 |
| Mar. 31, 2004 | (JP) | ............................ 2004-102639 |

(51) Int. Cl.
*A47C 7/72* (2006.01)
(52) U.S. Cl. ............................ 297/180.1; 297/180.13; 297/180.14; 297/452.41; 297/452.46
(58) Field of Classification Search ............ 297/180.1, 297/180.13, 180.14, 452.46, 452.47
See application file for complete search history.

(56) References Cited

U.S. PATENT DOCUMENTS

| 6,179,706 B1 * | 1/2001 | Yoshinori et al. ........... 454/120 |
| 6,206,465 B1 * | 3/2001 | Faust et al. ............. 297/180.14 |
| 6,224,150 B1 * | 5/2001 | Eksin et al. .............. 297/180.1 |
| 6,478,369 B1 * | 11/2002 | Aoki et al. ............. 297/180.13 |
| 6,685,553 B2 * | 2/2004 | Aoki .......................... 454/120 |
| 6,736,452 B2 * | 5/2004 | Aoki et al. ............. 297/180.13 |
| 2002/0067064 A1 | 6/2002 | Jaillet et al. |

FOREIGN PATENT DOCUMENTS

| JP | A 10-297274 | 11/1998 |
| JP | A 11-123124 | 5/1999 |
| JP | A 2002-219988 | 8/2002 |
| JP | A 2003-165325 | 6/2003 |

* cited by examiner

*Primary Examiner*—David Dunn
*Assistant Examiner*—Erika Garrett
(74) *Attorney, Agent, or Firm*—Oliff & Berridge, PLC

(57) ABSTRACT

A vehicle seat having: a seat cushion and a seat back formed by covering a surface of a seat pad with a top cover member; a plurality of air holes which penetrate the seat pad to reach a surface of the top cover member; a plurality of air outlets which project from a surface of a duct to be connected to the air holes; and an air blower to pressure and feed air inside a vehicle compartment to the air holes through the duct and the air outlets, wherein an engagement portion which projects in a radial direction of one of the air outlets is provided at a tip of the one of the air outlets.

5 Claims, 21 Drawing Sheets

VEHICLE SEAT

BACKGROUND OF THE INVENTION

1. Field of the Invention

The present invention relates to a vehicle seat having an air conditioning function.

2. Description of the Related Art

Recently, there is known a vehicle seat having an air conditioning function in which a plurality of air holes are provided in a top cover member of a seat cushion and a seat back of the vehicle seat, and air from an air blower is ejected from the air holes (refer to JP-Tokukaihei-10-297274).

The vehicle seat disclosed in JP-Tokukaihei-10-297274 is schematically configured such that the plurality of air holes are provided to penetrate a top cover member, a cover pad and a pad forming the seat cushion and the seat back, an air blower, an intermediate duct and a seat cushion air exhaust duct are arranged on a lower surface of the seat cushion, and a seat back air exhaust duct is arranged on a back surface of the seat back.

A plurality of air outlets which slightly project from the surface to engage with the inside of the air holes are formed on the seat cushion air exhaust duct and the seat back air exhaust duct. The air from the air blower is fed to the seat cushion air exhaust duct and the seat back air exhaust duct through the intermediate duct, and is then ejected from the air holes connected to the air outlets to the seat surface.

However, in the vehicle seat disclosed in JP-Tokukaihei-10-297274, the structure is such that the outer diameter of each air outlet approximately equals to the inner diameter of the each air hole to thereby engage the air outlets with the air holes, so that, for example, when a passenger sits in the vehicle seat, and the seat cushion and the seat back are deformed by receiving the weight of the passenger, the air outlets slidably move in the air holes. Thus, when the amount of the deformation of the seat cushion and the like is large, the air outlets may be uncoupled from the air holes.

Moreover, in the vehicle seat disclosed in the Patent Document 1, the seat cushion air exhaust duct and the seat back air exhaust duct have an approximately plane shape corresponding to that the lower surface of the seat cushion and the back surface of the seat back are also have an approximately plane shape.

Accordingly, for example, when a passenger spills liquid such as a drink or the like, the liquid entered from the air holes may pass the inside of the air exhaust duct to reach the air blower, thereby damaging the air blower.

SUMMARY OF THE INVENTION

The present invention has been achieved in view of the above problem, and an object of the present invention is to provide a vehicle seat which comprises a seat air conditioning function capable of stably ejecting air.

To solve the above problem, in accordance with the first aspect of the present invention, the vehicle seat of the present invention comprises:

a seat cushion and a seat back formed by covering a surface of a seat pad with a top cover member;

a plurality of air holes which penetrate the seat pad to reach a surface of the top cover member;

a plurality of air outlets which project from a surface of a duct to be connected to the air holes; and an air blower to pressure and feed air inside a vehicle compartment to the air holes through the duct and the air outlets, wherein an engagement portion which projects in a radial direction of one of the air outlets is provided at a tip of the one of the air outlets.

According to the vehicle seat, an engagement portion which projects in a radial direction of one of the air outlets is provided at a tip of the one of the air outlets. Thus, for example, the air outlets are fixed to the seat cushion and the seat back by sinking the engagement portions into the inner circumferential surfaces of the air holes in a state where the air outlets are inserted in the air holes. For example, even when a passenger sits in the vehicle seat, and the seat cushion and the seat back are deformed by receiving the weight of the passenger, the air outlets do not uncouple from the air holes, enabling to stably ejecting air.

Consequently, it is possible to obtain the vehicle seat which has a seat air conditioning function capable of ejecting comfortable air with high pressure, comfortable to sit in, and is further easy to be manufactured.

Preferably, in the vehicle seat of the present invention, the vehicle seat further comprises an insert member which has a tubular shape and is embedded inside one of the air holes, wherein one of the air outlets is inserted into the insert member to be engaged therewith.

According to the vehicle seat, since the insert member is used, the air outlets can be fixed to the seat cushion and the seat back more firmly.

Preferably, in the vehicle seat of the present invention, the insert member is integrally formed with the seat pad.

According to the vehicle seat, by integrally forming the insert member with the seat pad, embedding operation of the insert member to the inside of the air hole can be eliminated, enabling to simplify the manufacturing process of the vehicle seat. Moreover, the insert member can be fixed to the seat pad more firmly.

Preferably, in the vehicle seat of the present invention, the duct has a bellows structure at least at one position thereof.

According to the vehicle seat, providing the bellows structure in the duct can make it possible to deform the duct to flexibly correspond to the deformation of the seat cushion and the seat back, which makes the air outlet not easily uncoupled from the air hole.

In accordance with the second aspect of the present invention, the vehicle seat of the present invention comprises:

a seat cushion and a seat back formed by covering a surface of a seat pad with a top cover member;

a plurality of air holes which penetrate the seat pad to reach a surface of the top cover member;

a plurality of air outlets which project from a surface of a duct to be connected to the air holes; and an air blower to pressure and feed air inside a vehicle compartment to the air holes through the duct and the air outlets, wherein a bellows structure is provided at two or more positions of the duct between continuing two of the air outlets.

For example, when the seat back is deformed by receiving the weight of a passenger at the time of sitting in the vehicle seat, the relative position of the two air outlets which are consecutively provided on the duct also changes. Because of the position change, the external force acts to each air outlet to uncouple the air outlets from the air holes.

As described above, in the case of providing two or more bellows structures between the two consecutive air outlets, the portion between the two bellows structures of the duct inclines and rotates corresponding to the relative position change of the two air outlets accompanying the deformation of the seat back. However, the portion between the air outlet and the bellows structure does not incline and rotate. That is, the relative position change of the two air outlets is absorbed at the portion between the two bellows structures, so that the action of the external force acting to the air outlets to uncouple the air outlets from the air holes can be decreased, thus enabling to obtain the effect to increase the bonding strength of the air outlet to the air hole.

Consequently, the vehicle seat having the air conditioning function capable of stably ejecting air can be obtained.

Preferably, in the vehicle seat of the present invention, an engagement portion is provided at a tip of one of the air outlets, the engagement portion projecting in a radial direction of the one of the air outlets.

According to the vehicle seat, an engagement portion which projects in a radial direction of one of the air outlets is provided at a tip of the one of the air outlets. Thus, for example, the air outlets are fixed to the seat cushion and the seat back by sinking the engagement portions into the inner circumferential surfaces of the air holes in a state where the air outlets are inserted in the air holes. For example, even when a passenger sits in the vehicle seat, and the seat cushion and the seat back are deformed by receiving the weight of the passenger, the air outlets do not uncouple from the air holes, enabling to stably ejecting air.

Preferably, in the vehicle seat of the present invention, the vehicle seat further comprises an insert member which has a tubular shape and is embedded inside one of the air holes,
wherein one of the air outlets is inserted into the insert member to be engaged therewith.

According to the vehicle seat, since the insert member is used, the air outlets can be fixed to the seat cushion and the seat back more firmly.

Preferably, in the vehicle seat of the present invention, the insert member is integrally formed with the seat pad.

According to the vehicle seat, by integrally forming the insert member with the seat pad, embedding operation of the insert member to the inside of the air hole can be eliminated, enabling to simplify the manufacturing process of the vehicle seat. Moreover, the insert member can be fixed to the seat pad more firmly.

In accordance with the third aspect of the present invention, the vehicle seat of the present invention comprises:
 a seat cushion and a seat back formed by covering a surface of a seat pad with a top cover member;
 a plurality of air holes which penetrate the seat pad to reach a surface of the top cover member;
 a plurality of air outlets which project from a surface of a duct to be connected to the air holes; and
 an air blower to pressure and feed air inside a vehicle compartment to the air holes through the duct and the air outlets,
 wherein a portion of the duct attached to the seat cushion side and the seat back side bends upward or downward with respect to a horizontal direction.

According to the vehicle seat, since a portion of each duct attached to the seat cushion side and the seat back side bends upward or downward with respect to the horizontal direction. Thus, for example, when a passenger spills liquid such as a drink or the like on the seat cushion or the seat back, the liquid entered from the air holes into the ducts is prevented from flowing at the upwardly bending portion of the duct, or stays at the downwardly bending portion of the duct. Thus, the situation of the air blower failure due to the liquid reached to the air blowers can be prevented from occurring.

Consequently, the vehicle seat having the air conditioning function capable of stably ejecting air can be obtained.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein.

DETAILED DESCRIPTION OF THE PREFERRED EMBODIMENTS

First Embodiment

Figure 1:
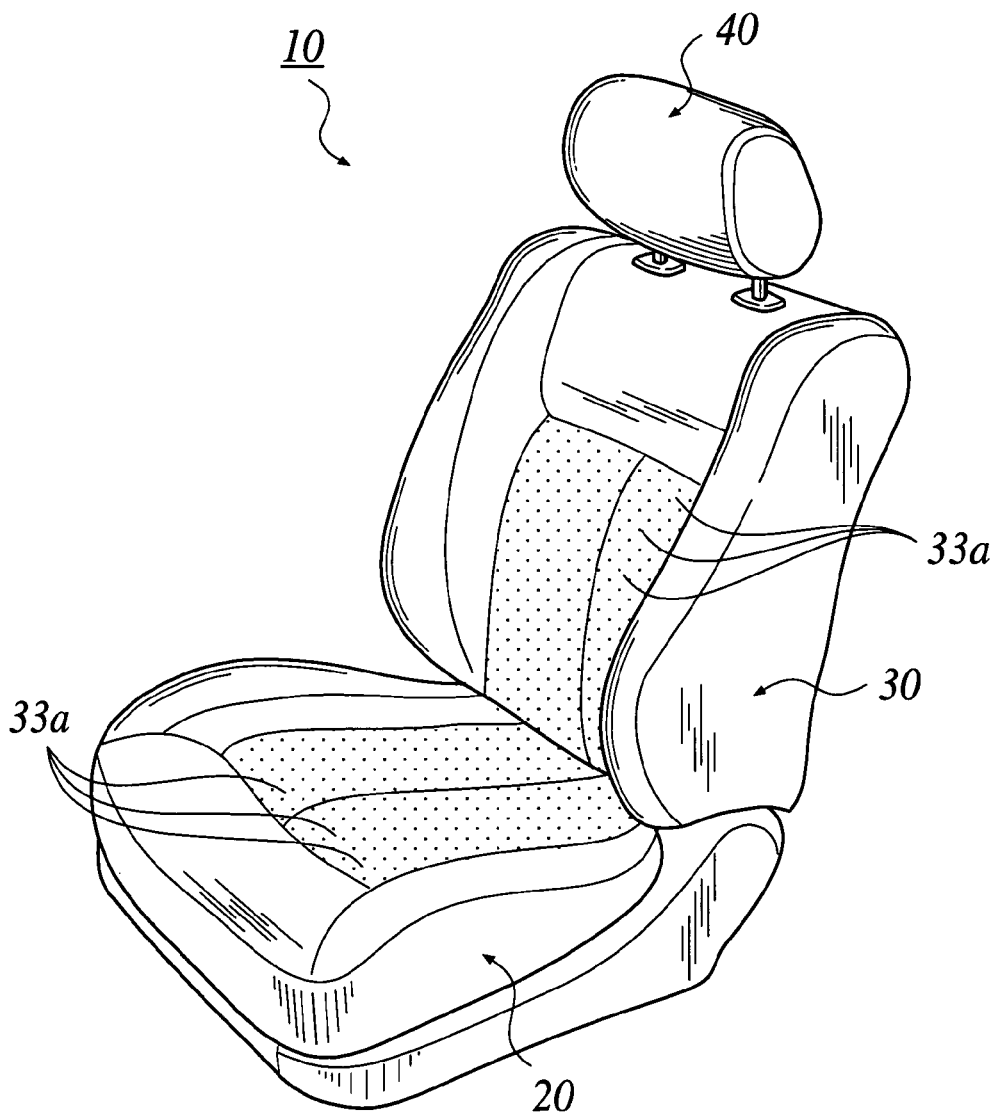
FIG. 1 is a perspective view showing an outline of a vehicle seat.
Figure 1:
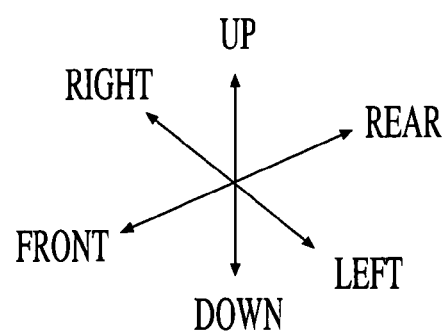

The first embodiment for embodying the present invention will be explained in detail below referring to the drawings.

Figure 2:
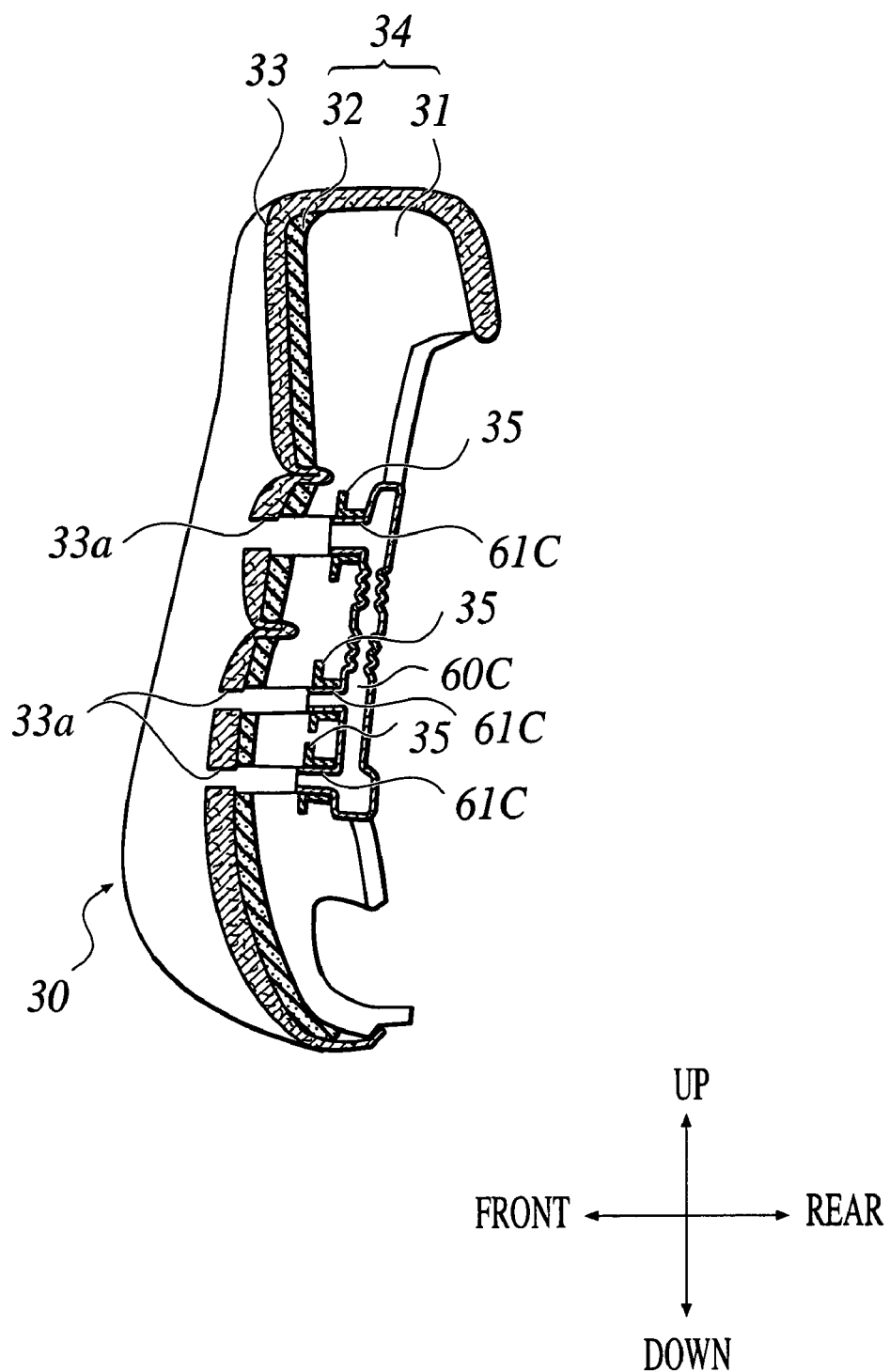
FIG. 2 is a longitudinal sectional view of a main portion showing a structure of a seat cushion.

As shown in FIG. 1, a vehicle seat 10 is schematically configured to comprise a seat cushion 20, a seat back 30, a head rest 40 provided on the upper portion of the seat back 30 and the like. Among them, as shown in FIG. 2, the seat back 30 is configured such that a surface of a pad 31 which keeps a seat shape and functions as a cushion member is covered with a cover pad 32 with permeability, and the surface of the cover pad 32 is further covered with a top cover member 33. FIG. 2 shows the seat back 30, however, similarly, the seat cushion 20 is also configured such that the surface of the pad 31 is covered with the cover pad 32 and the top cover member 33. Hereinafter, the combination of the pad 31 and the cover pad 32 is described as a "seat pad 34".

Figure 3:
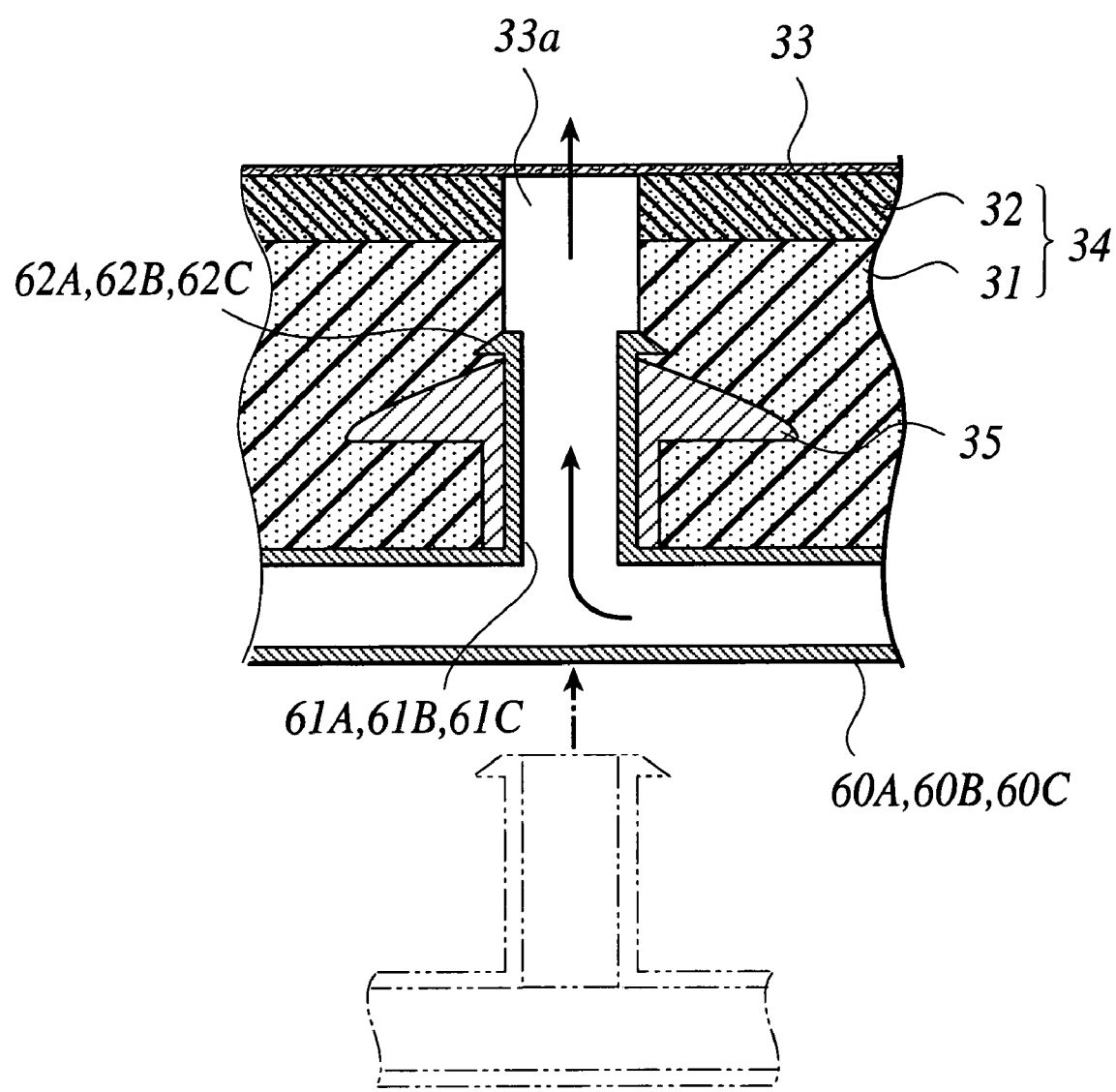
FIG. 3 is a cross sectional view of a main portion showing a coupling structure of an air hole and an air outlet.

As shown in FIG. 1, there are a plurality of air holes 33a formed in the surface of the top cover member 33. As shown in FIG. 3, a tubular insert member 35 is embedded inside the air hole 33a.

The insert member 35 is fixed to the inside of each air hole 33a by producing the seat pad 34 by foam molding in a state where the insert member 35 is arranged at the predetermined position in a seat pad molding die beforehand.

Figure 4:
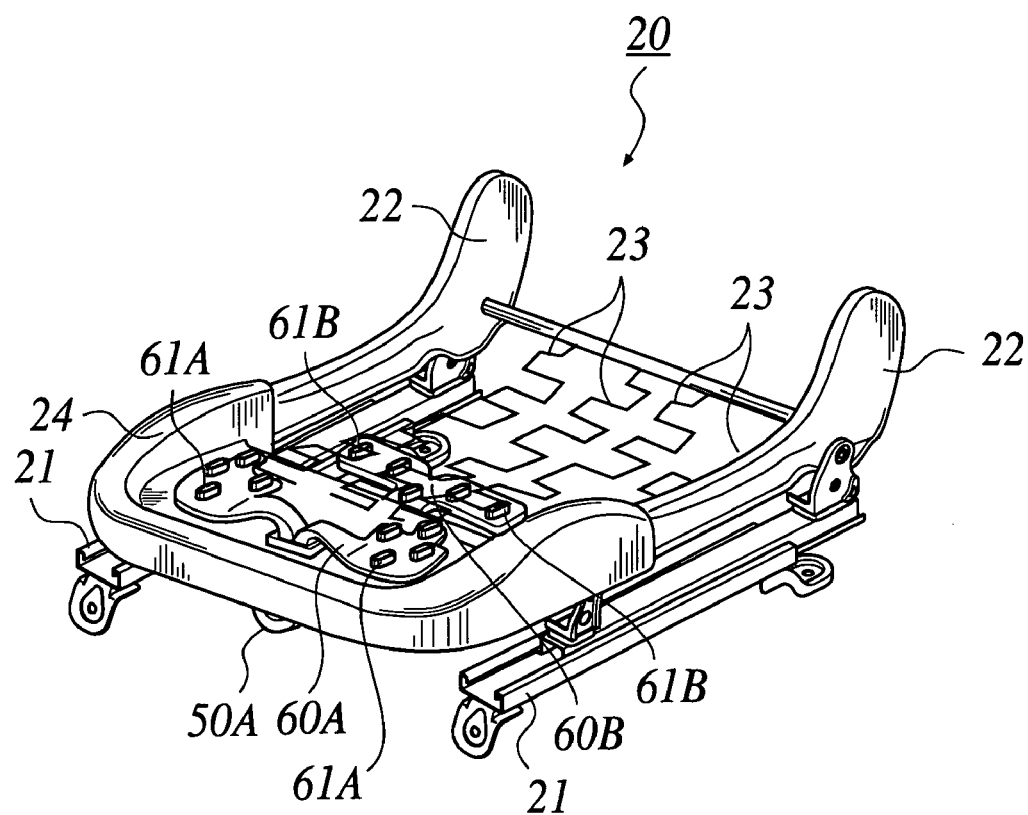
FIG. 4 is a perspective view showing a framework structure of the seat cushion side of the vehicle seat.
Figure 4:
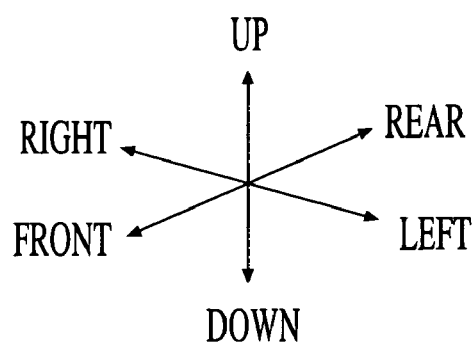
Figure 5:
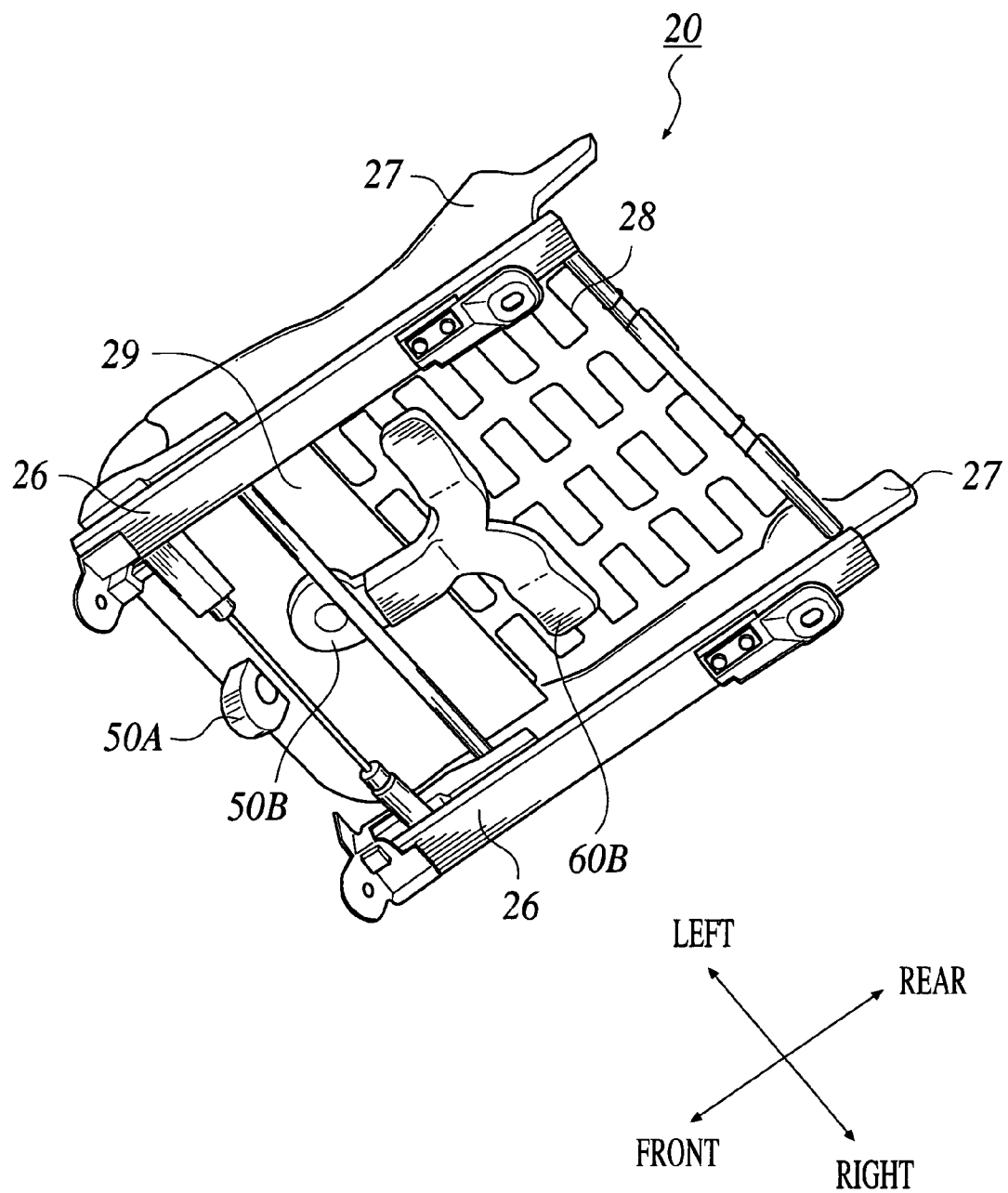
FIG. 5 is a perspective view showing the framework structure of the seat cushion side of the vehicle seat.

FIG. 4 is a perspective view showing a framework structure of the seat cushion 20 side of the vehicle seat 10, and FIG. 5 is a perspective view of the framework structure as seen from the lower surface side.

The framework structure of the seat cushion 20 side is schematically configured to comprise a pair of right and left seat rails 21, a pair of right and left seat frames 22 attached to the seat rails 21, seat springs 23, a pan frame 24 which is crossed over the seat springs 23 and the front portions of the seat frames 22, and the like.

As shown in FIG. 5, air blowers 50A and 50B for the seat cushion 20 are attached to the front and center of the lower surface of the pan frame 24, respectively.

As shown in FIG. 4, a duct 60A connected to the air blow hole of the front air blower 50A passes the opening provided in the pan frame 24 to reach the upper surface of the pan frame 24, and extends backward on the upper surface of the pan frame 24 in the state of branching off in right and left direction.

As shown in FIGS. 4 and 5, a duct 60B connected to the air blow hole of the central (back) air blower 50B extends backward on the lower surface side of the pan frame 24, and branches off in right and left direction.

As shown in FIG. 3, a plurality of tubular air outlets 61A, 61B are provided to project upward at the positions on the upper surface of the ducts 60A, 60B corresponding to the plurality of air holes 33a, respectively. Pawl shaped engagement portions 62A, 62B are formed at the tips of the air outlets 61A, 61B to project in a radial direction, respectively.

Figure 6:
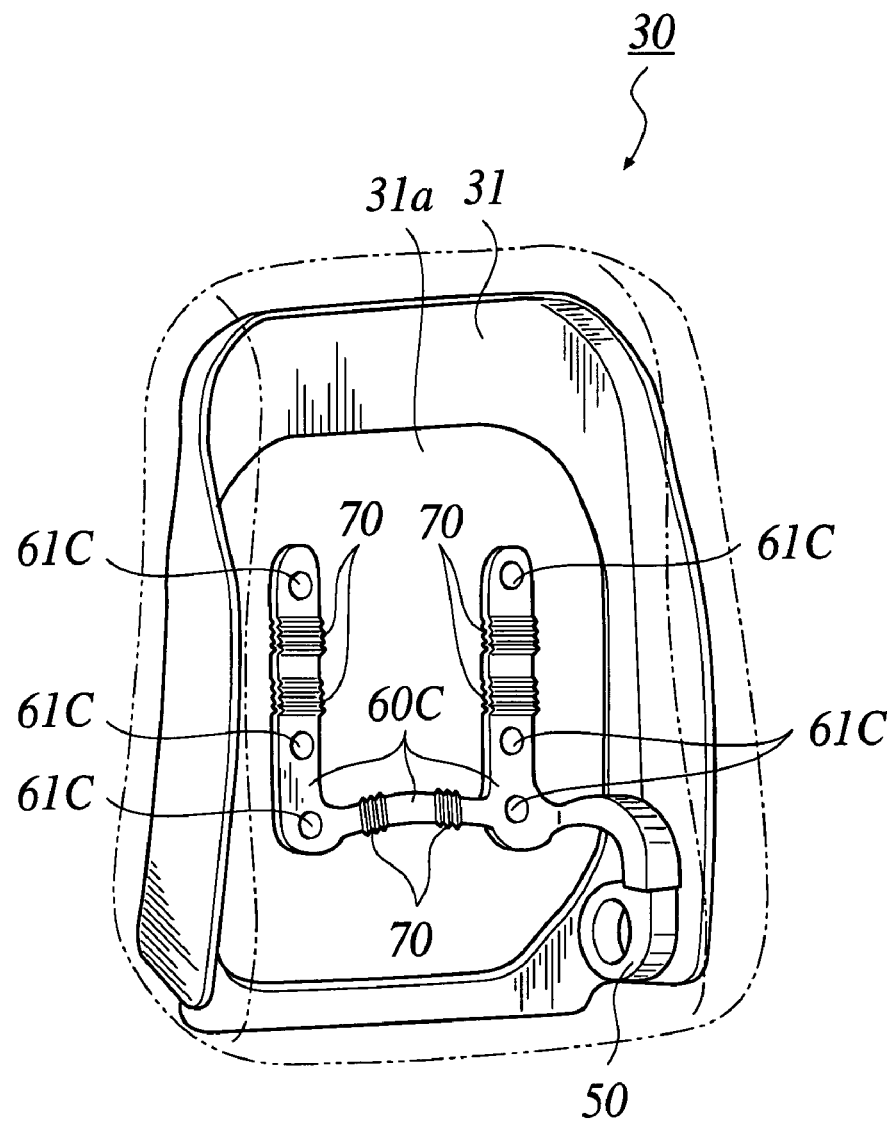
FIG. 6 is a perspective view showing a framework structure of the seat back side of the vehicle seat.
Figure 6:
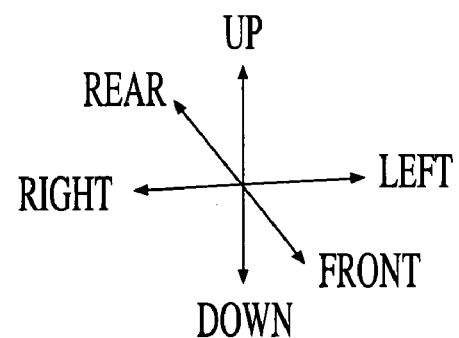

FIG. 6 is a back view of the seat back 30, and the seat back 30 is schematically configured to comprise a sub seat frame 31 having an opening 31a in the center, a seat spring (omitted from the drawings) attached to the sub seat frame 31 and the like.

An air blower 50C for the seat back is attached to one of the right and left lower sides of the back surface of the sub seat frame 31.

A duct 60C connected to the air blow hole of the air blower 50C extends upward from the right and left positions in the opening 31a of the sub seat frame 31. Each of the right and left ducts and the intermediate duct extending between the right and left ducts in the right and left direction has a bellows structure 70 at two points.

At the positions corresponding to the plurality of air holes 33a on the front surface of the duct 60C, similar to the above seat cushion 20 side, a plurality of tubular air outlets 61C are provided to project upward. A pawl shaped engagement portion 62C is formed at the tip of each air outlet 61C to project in a radial direction.

As shown in FIG. 3, the air outlets 61A, 61B, 61C of the seat cushion 20 side and the seat back 30 side are all designed to have a length slightly longer than the length of the insert member 35 in an axis direction. Each of the engagement portions 62A, 62B, 62C of the air outlets 61A, 61B, 61C is inserted into the insert member 35 to engage the tip portion of the insert member 35, so that each of the air outlets 61A, 61B, 61C is fixed to the insert member 35, and consequently, fixed to the seat cushion 20 or the seat back 30.

As above, according to the seat vehicle 10 of this embodiment, the air outlets 61A, 61B, 61C projecting from the ducts 60A, 60B, 60C engage the insert members 35 embedded inside the air holes 33a through the engagement portions 62A, 62B, 62C, respectively, so that, for example, even when a passenger sits in the vehicle seat 10, and the seat cushion 20 and the seat back 30 are deformed by receiving the weight of the passenger, the air outlets 61A, 61B, 61C do not uncouple from the air holes 33a, enabling to stably ejecting air.

Providing the bellows structures 70 in the duct 60C on the seat back side can make it possible to deform the duct 60C to flexibly correspond to the deformation of the seat back 30, which makes the air outlet 61C not easily uncoupled from the air hole 33a.

Only one bellows structure 70 may be provided between the consecutive two air outlets 61C in the right and left direction and the vertical direction, respectively, however, as shown in FIG. 6, it is preferable to provide two or more bellows structures between two air outlets 61C. In the case where two or more bellows structures exist between two air outlets 61C, even when an external force acts on the air outlets 61C with the deformation of the seat back 30, and the relative position of the two air outlets 61C is changed, only the portion of the duct 60C between the two bellows structures 70 inclines or the like to absorb this position change. Thus, it is possible to further make the air outlets 61C not easily uncoupled from the air holes 33a.

The bellows structure 70 may be provided on the ducts 60A, 60B on the seat cushion 20 side. In this case, similar to the bellows structure 70 provided on the seat back 30 side, it is possible to make the air outlets 61A, 61B not easily uncoupled from the air holes 33a.

In this embodiment, the insert member 35 is embedded inside each air hole 33a, and each of the engagement portions 62A, 62B, 62C of the air outlets 61A, 61B, 61C engages the insert member 35, however, it is not limited thereto. The structure may be such that the air outlets 61A, 61B, 61C are fixed to the seat cushion 20 and the seat back 30 by sinking the pawl shaped engagement portions 62A, 62B, 62C into the inner circumferential surfaces of the air holes 33a in a state where the air outlets 61A, 61B, 61C are inserted in the air holes 33a without providing the insert member 35 to the inside of each air hole 33a.

Second Embodiment

The second embodiment for embodying the present invention will be explained in detail below referring to the drawings.

Figure 7:
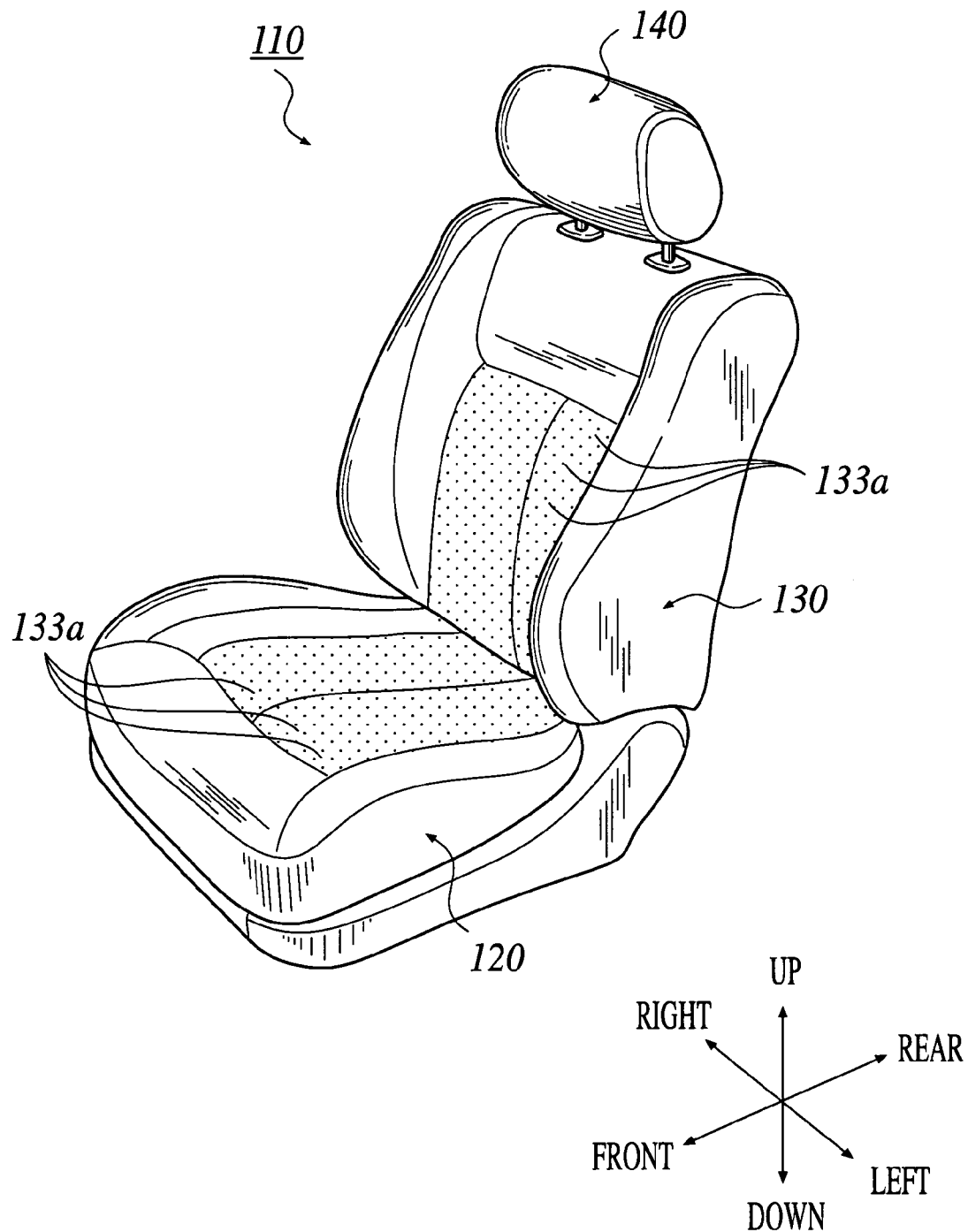
FIG. 7 is a perspective view showing an outline of a vehicle seat.
Figure 8:
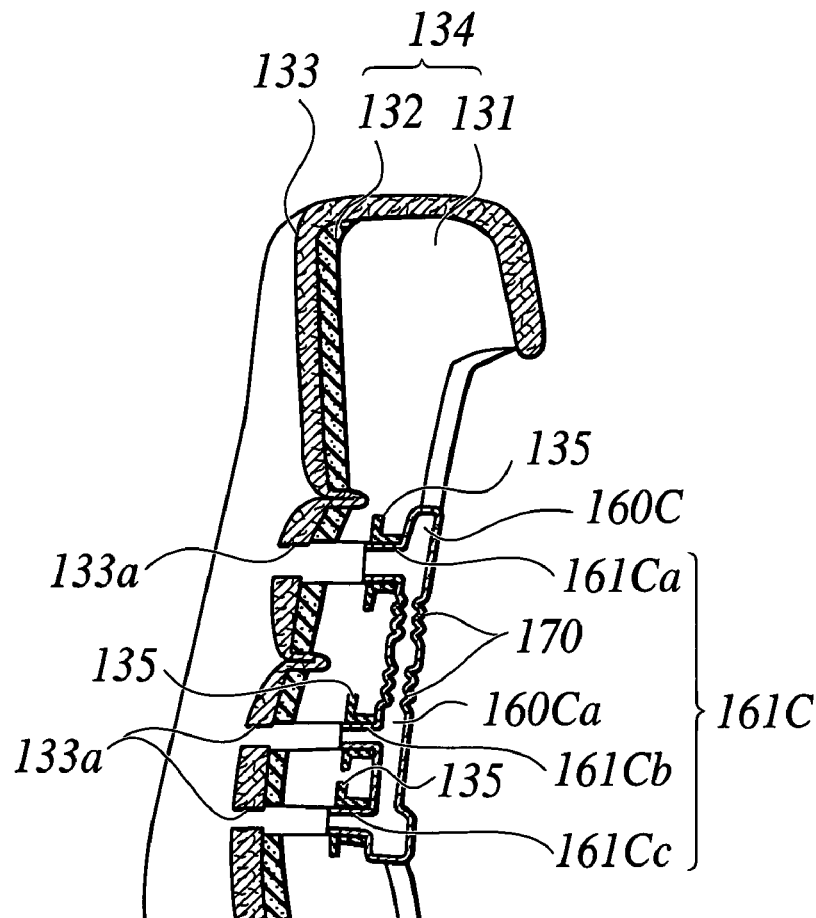
FIG. 8 is a longitudinal sectional view of a main portion showing a structure of a seat cushion.
Figure 8:
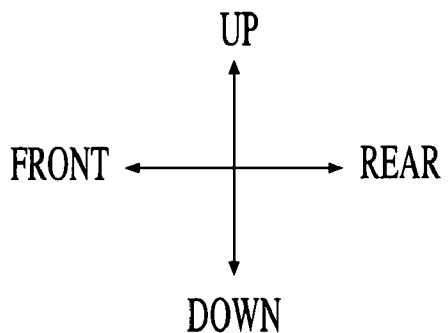

As shown in FIG. 7, a vehicle seat 110 is schematically configured to comprise a seat cushion 120, a seat back 130, a head rest 140 provided on the upper portion of the seat back 130 and the like. Among them, as shown in FIG. 8, the seat back 130 is configured such that a surface of a pad 131 which keeps a seat shape and functions as a cushion member is covered with a cover pad 132 with permeability, and the surface of the cover pad 132 is further covered with a top cover member 133. FIG. 8 shows the seat back 130, however, similarly, the seat cushion 120 is also configured such that the surface of the pad 131 is covered with the cover pad 132 and the top cover member 133. Hereinafter, the combination of the pad 131 and the cover pad 132 is described as a "seat pad 134".

Figure 9:
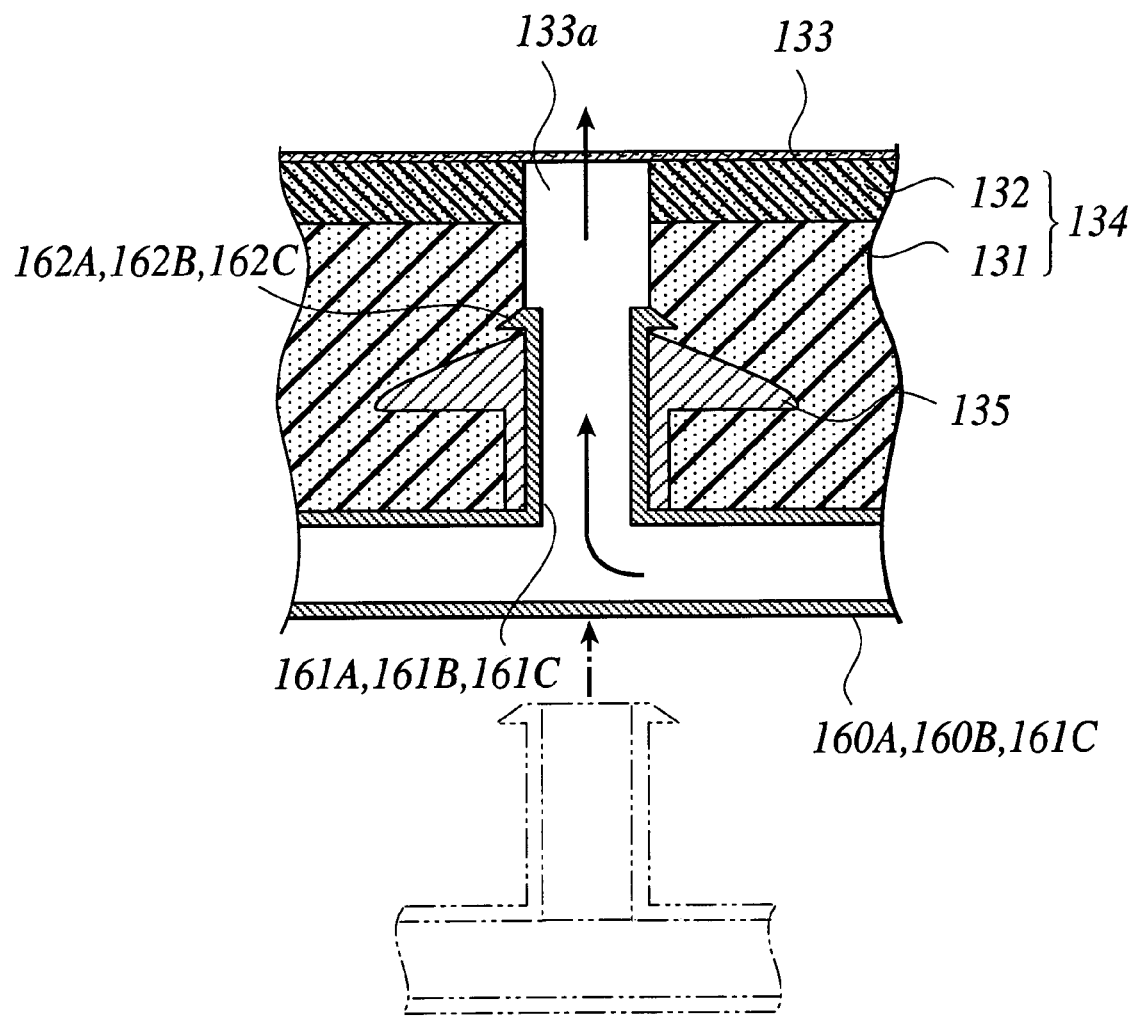
FIG. 9 is a cross sectional view of a main portion showing a coupling structure of an air hole and an air outlet.

As shown in FIG. 7, there are a plurality of air holes 133a formed in the surface of the top cover member 133. As shown in FIG. 9, a tubular insert member 135 is embedded inside the air hole 133a.

The insert member 135 is fixed to the inside of each air hole 133a by producing the seat pad 134 by foam molding in a state where the insert member 135 is arranged at the predetermined position in a seat pad molding die beforehand.

Figure 10:
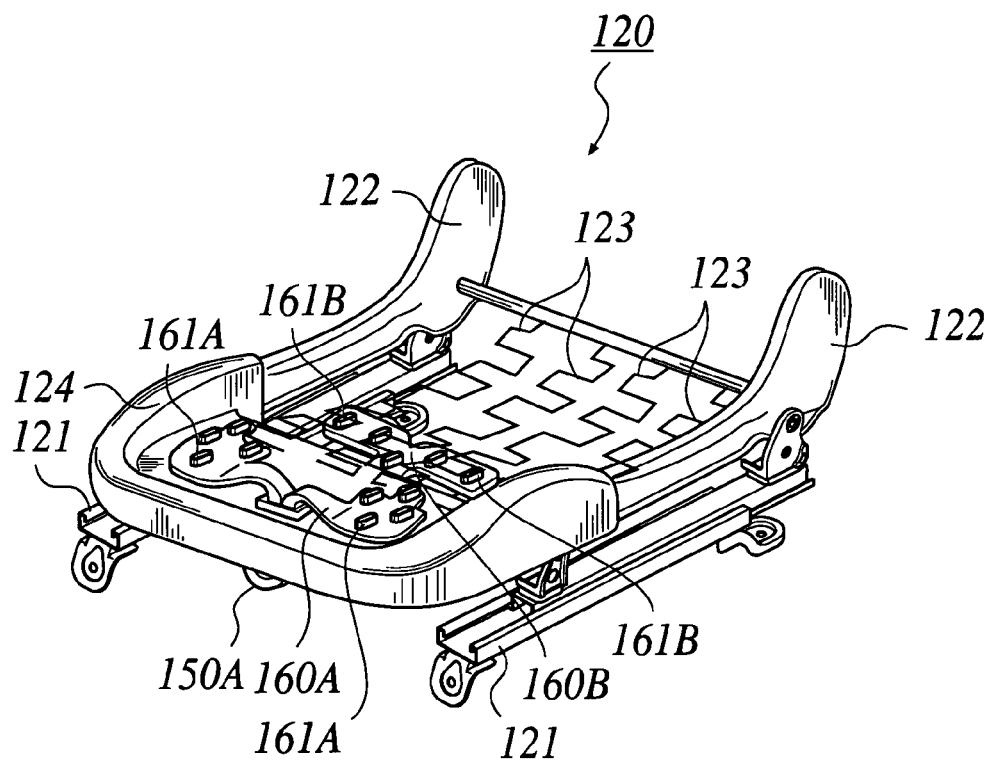
FIG. 10 is a perspective view showing a framework structure of the seat cushion side of the vehicle seat.
Figure 10:
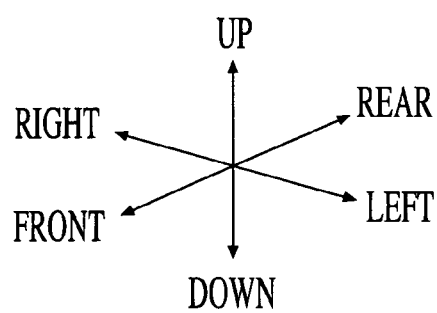
Figure 11:
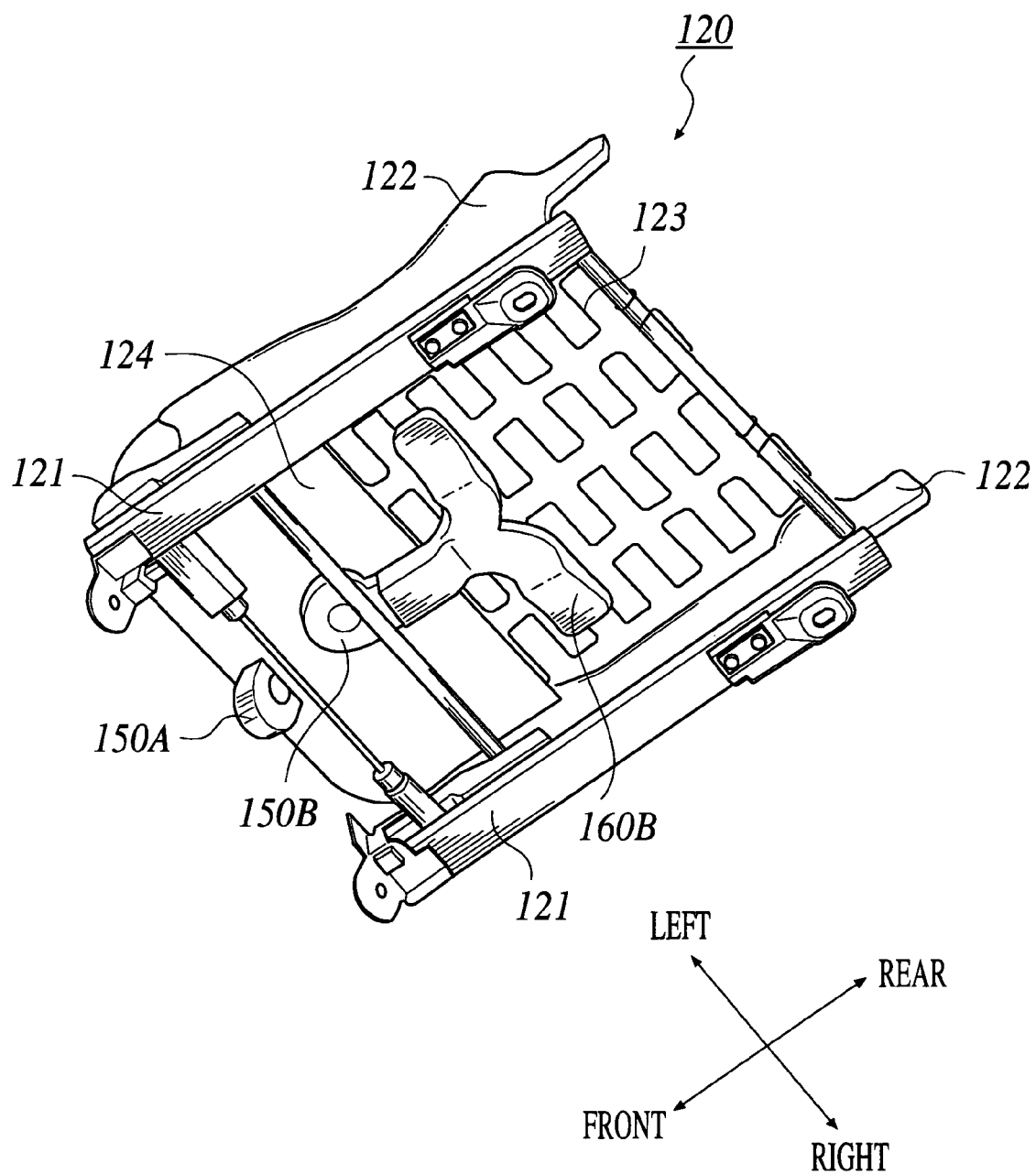
FIG. 11 is a perspective view showing the framework structure of the seat cushion side of the vehicle seat.

FIG. 10 is a perspective view showing a framework structure of the seat cushion 120 side of the vehicle seat 110, and FIG. 11 is a perspective view of the framework structure as seen from the lower surface side.

The framework structure of the seat cushion 120 side is schematically configured to comprise a pair of right and left seat rails 121, a pair of right and left seat frames 122 attached to the seat rails 121, seat springs 123, a pan frame 124 which is crossed over the seat springs 123 and the front portions of the seat frames 122, and the like.

As shown in FIG. 11, air blowers 150A and 150B for the seat cushion 120 are attached to the front and center of the lower surface of the pan frame 124, respectively.

A duct 160A connected to the air blow hole of the front air blower 150A passes the opening provided in the pan frame 124 to reach the upper surface of the pan frame 124 as shown in FIG. 10, and extends backward on the upper surface of the pan frame 124 in the state of branching off in right and left direction.

As shown in FIGS. 10 and 11, a duct 160B connected to the air blow hole of the central (back) air blower 150B extends backward on the lower surface side of the pan frame 124, and branches into right and left direction.

As shown in FIG. 9, a plurality of tubular air outlets 161A, 161B are provided to project upward at the positions on the upper surface of the ducts 160A, 160B corresponding to the plurality of air holes 133a, respectively. Pawl shaped engagement portions 162A, 162B are formed at the tips of the air outlets 161A, 161B to project in a radial direction, respectively.

Figure 12:
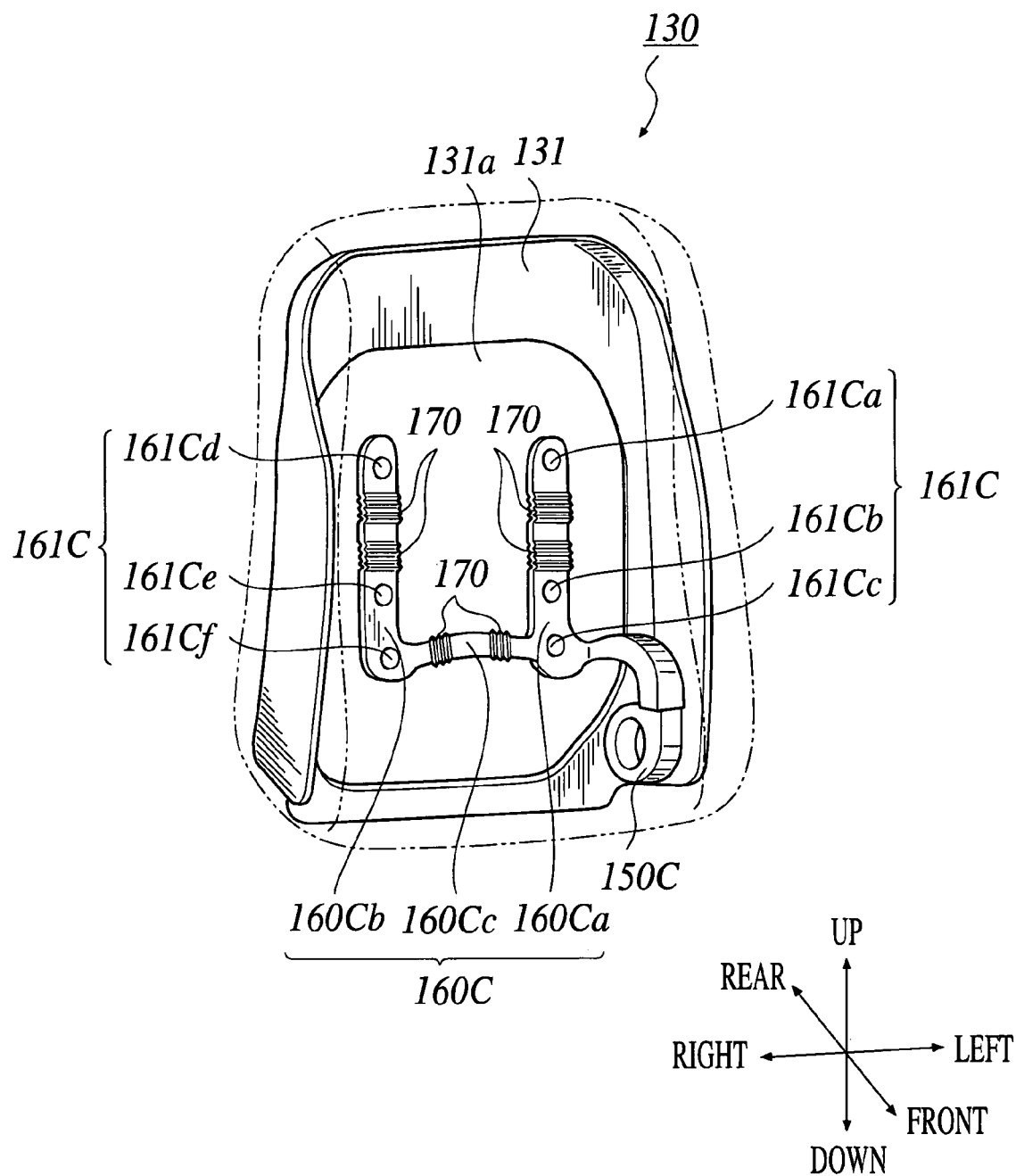
FIG. 12 is a perspective view showing a framework structure of the seat back side of the vehicle seat.

FIG. 12 is a back view of the seat back 130, and the seat back 130 is schematically configured to comprise a sub seat frame 131 having an opening 131a in the center, a seat spring (omitted from the drawings) attached to the sub seat frame 131 and the like.

An air blower 150C for the seat back is attached to one of the right and left lower sides of the back surface of the sub seat frame 131.

A duct 160C connected to the air blow hole of the air blower 150C extends upward from the right and left positions in the opening 131a of the sub seat frame 131. In the following explanation, the ducts 160C extending upward from the right and left positions are represented as "left side duct 160Ca" and "right side duct 160Cb", respectively, and the duct 160C extending in right and left direction between the left side duct 160Ca and the right side duct 160Cb is represented as "central duct 160Cc".

On each of the left side duct 160Ca and the right side duct 160Cb, a plurality of (three in FIG. 12) tubular air outlets 161C (first air outlets 161Ca, 161Cd, second air outlets 161Cb, 161Ce and third air outlets 161Cc, 161Cf) are formed. Also, two bellows structures 170 are provided between the first air outlet 161Ca and the second air outlet 161Cb, and between the first air outlet 161Cd and the second air outlet 161Ce, respectively. Further, two bellows structures 170 are provided between the two right and left third air outlets 161Cc, 161Cf.

The operation of the bellows structure 170 will be explained below referring to the two bellows structures 170 provided on the central duct 160Cc.

Figure 13:
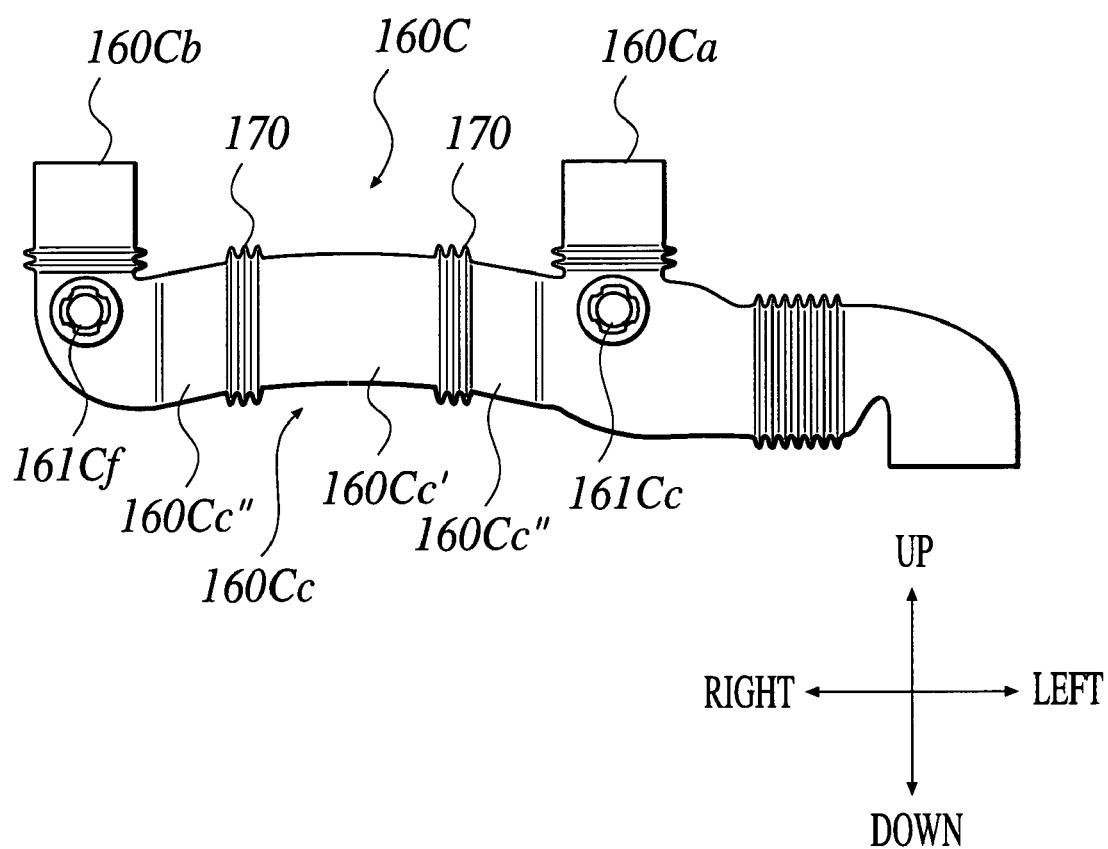
FIG. 13 is a front view showing a structure of an intermediate duct.
Figure 14A:
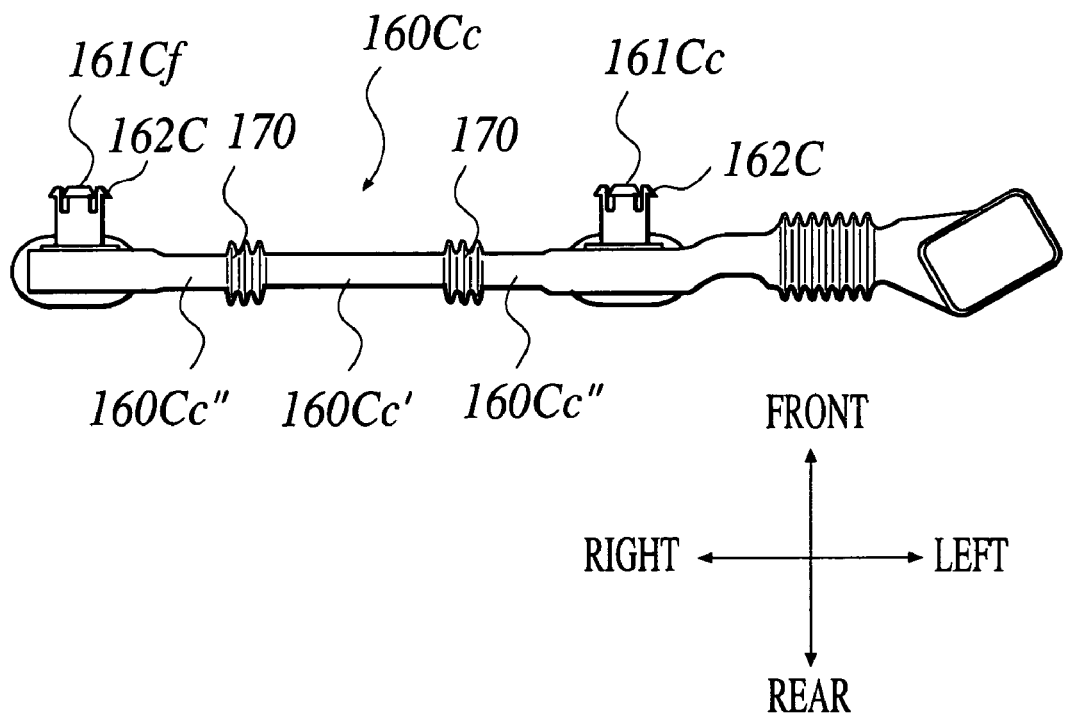
FIGS. 14A and 14B are bottom views showing structures of the intermediate duct.
Figure 14B:
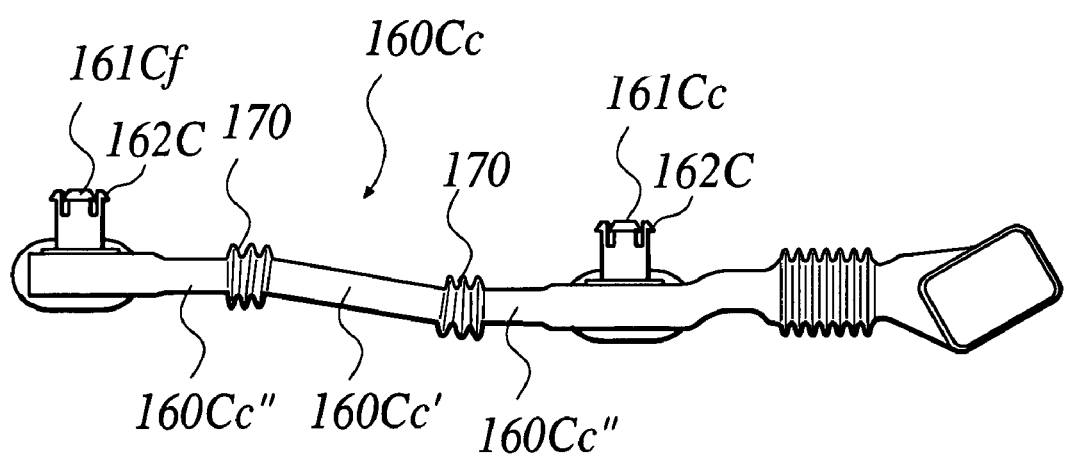

FIG. 13 is a front view of the central duct 160Cc, and FIGS. 14A and 14B are bottom views of the central duct 160Cc.

For example, when a passenger sit in the vehicle seat 110 and the seat back 130 is deformed by receiving the weight of the passenger, the relative position of the third air outlets 161Cc, 161Cf consecutively provided in the central duct 160Cc in the right and left direction changes relative to the back and forth direction, and each of the right and left bellows structures 170 bends and extends corresponding thereto. Thereby, only a portion 160Cc' between the two bellows structures 170 of the central duct 160Cc inclines, and a portion 160Cc" between the third air outlet 161Cc and the left side bellows structure 170 does not incline, maintaining the condition same as the condition before the relative position change of the third air outlets 161Cc, 161Cf. Thus, the relative position change of the third air outlets 161Cc, 161Cf is absorbed by the portion 160Cc' between the two bellows structures 170 of the central duct 160Cc, so that action of the external force to the third air outlets 161Cc, 161Cf to uncouple the third air outlets 161Cc, 161Cf from the air holes 133a can be decreased, thus enabling to obtain the effect to increase the bonding strength of the air outlet 161C to the air hole 133a.

The effect similar to the above effect can be obtained when the relative position of the third air outlets 161Cc, 161Cf changes relative to the up and down direction, and also on the left side duct 160Ca and the right side duct 160Cb by the bending and extension of the two bellows structures 170 provided on each duct.

Further, the above described two bellows structures 170 may be provided on the ducts 160A, 160B on the seat cushion 120 side. In this case, similar to the two bellows structures 170 provided on the seat back 130 side, it is possible to make the air outlets 161A, 161B not easily uncoupled from the air holes 133a.

As shown in FIG. 9, the engagement portions 162A, 162B, 162C projecting in the radial direction are formed at the tips of the air outlets 161A, 161B, 161C, respectively. The air outlets 161A, 161B, 161C of the seat cushion 120 side and the seat back 130 side are all designed to have a length slightly longer than the length of the insert member 135 in the axis direction. Each of the engagement portions 162A, 162B, 162C of the air outlets 161A, 161B, 161C is inserted into the insert member 135 to engage the tip portion of the insert member 135, so that each of the air outlets 161A, 161B, 161C is fixed to the insert member 135, and consequently, fixed to the seat cushion 120 or the seat back 130.

As above, according to the vehicle seat 110 of this embodiment, for example, even when a passenger sits in the vehicle seat 110, and the seat cushion 120 and the seat back 130 are deformed by receiving the weight of the passenger, the two bellows structures 170 provided between two consecutive air outlets 161A, 161B, 161C is bent and extended. Thus, as described above, the effect of increasing the bonding strength of the air outlets 161A, 161B, 161C to the air holes 133a can be obtained. Further, the air outlets 161A, 161B, 161C projecting from the ducts 160A, 160B, 160C engage the insert members 135 embedded inside the air holes 133a through the engagement portions 162A, 162B, 162C, respectively, so that the air outlets 161A, 161B, 161C do not uncouple from the air holes 133a. Thus, the effect to further increase the bonding strength of the air outlets 161A, 161B, 161C to the air holes 133a can be obtained, enabling to stably eject air.

In this embodiment, the insert member 135 is embedded inside each air hole 133a, and each of the engagement portions 162A, 162B, 162C of the air outlets 161A, 161B, 161C engages the insert member 135, however, it is not limited thereto. The structure may be such that the air outlets 161A, 161B, 161C are fixed to the seat cushion 120 and the seat back 130 by sinking the pawl shaped engagement portions 162A, 162B, 162C into the inner circumferential surfaces of the air holes 133a in a state where the air outlets 161A, 161B, 161C are inserted in the air holes 33a without providing the insert member 135 to the inside of each air hole 133a.

Third Embodiment

The third embodiment for embodying the present invention will be explained in detail below referring to the drawings.

Figure 15:
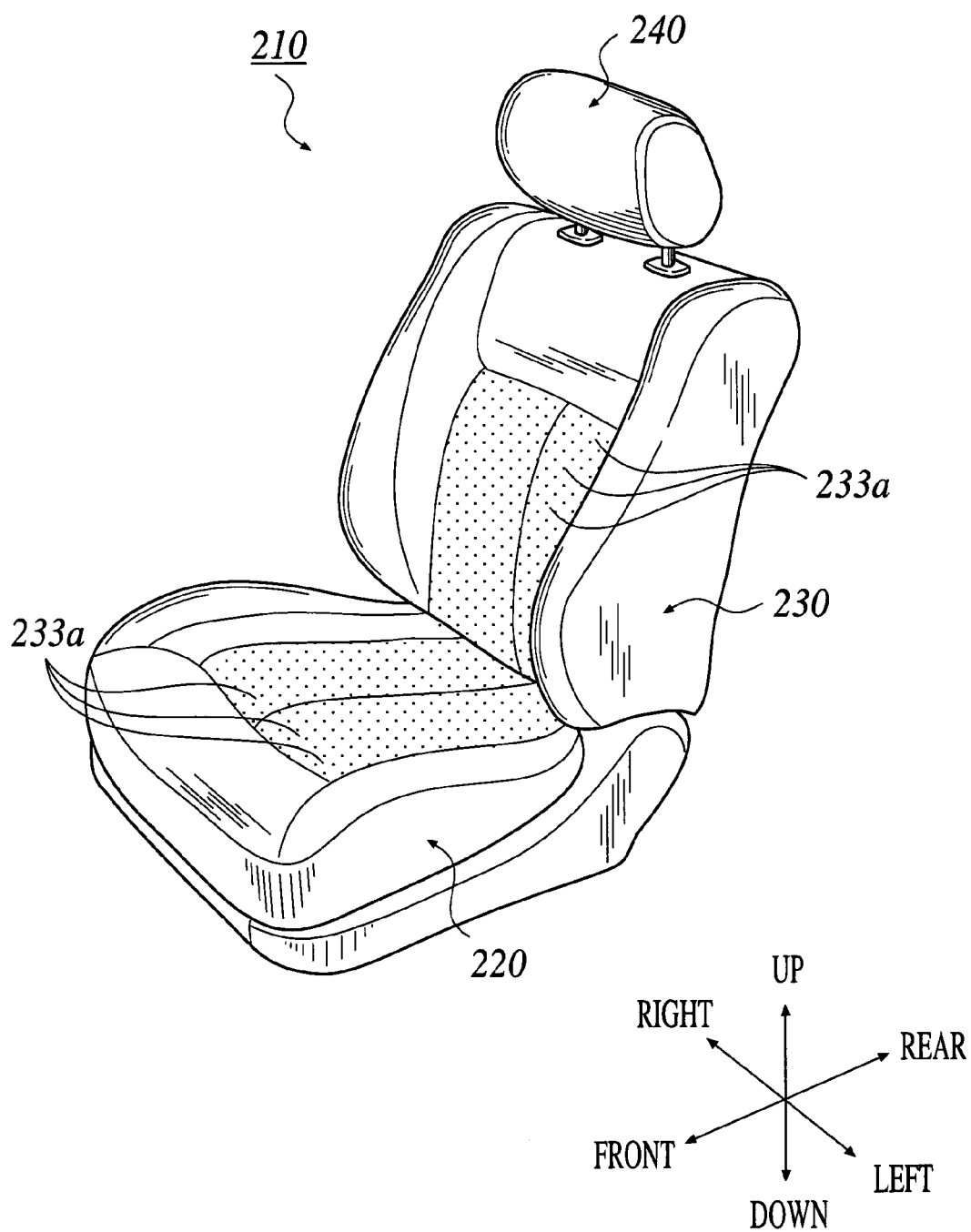
FIG. 15 is a perspective view showing an outline of a vehicle seat.
Figure 16:
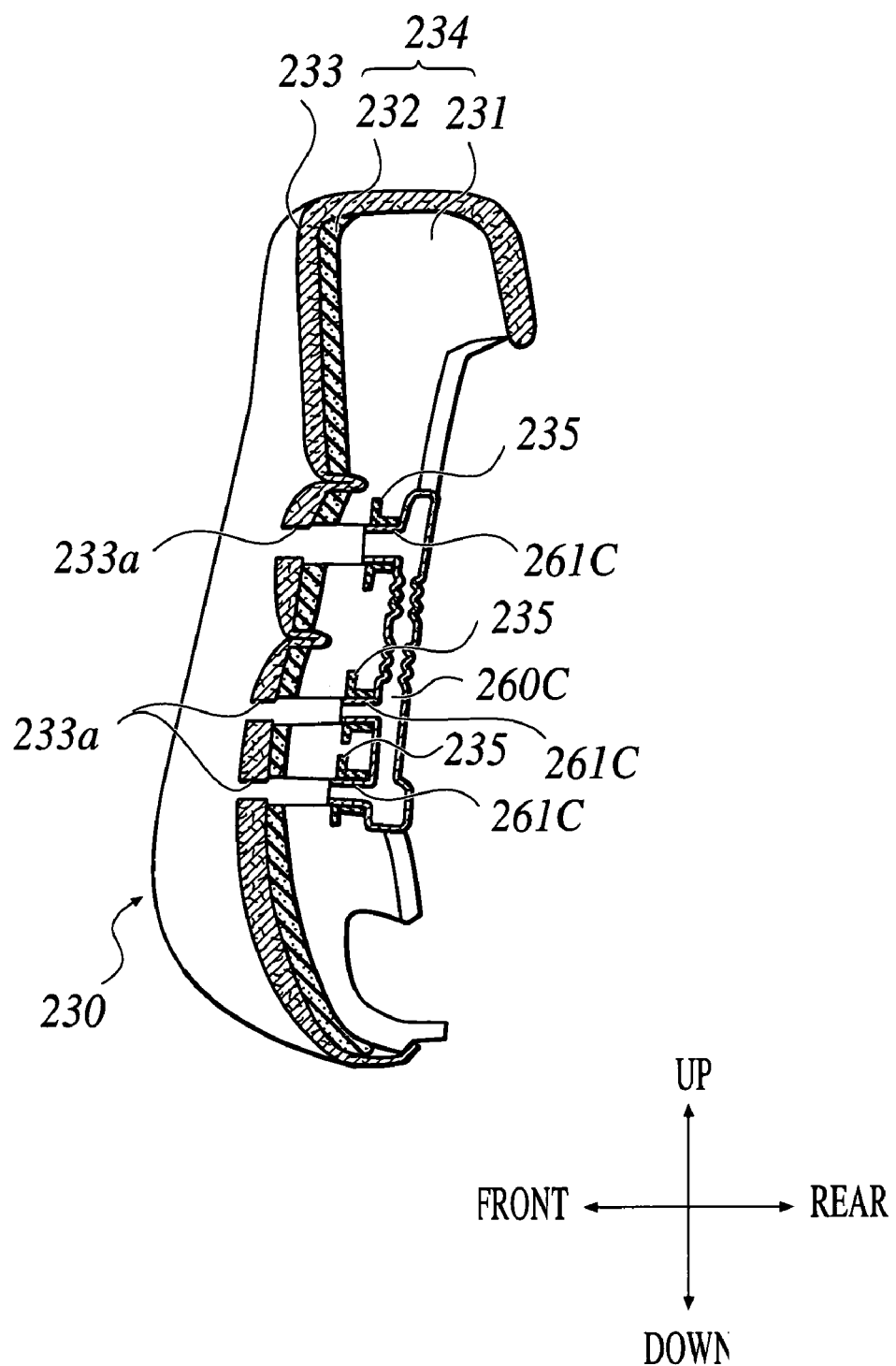
FIG. 16 is a longitudinal sectional view of a main portion showing a structure of a seat cushion.

As shown in FIG. 15, a vehicle seat 210 is schematically configured to comprise a seat cushion 220, a seat back 230, a head rest 240 provided on the upper portion of the seat back 230 and the like. Among them, as shown in FIG. 16, the seat back 230 is configured such that a surface of a pad 231 which keeps a seat shape and functions as a cushion member is covered with a cover pad 232 with permeability, and the surface of the cover pad 232 is further covered with a top cover member 233. FIG. 16 shows the seat back 230, however, similarly, the seat cushion 220 is also configured such that the surface of the pad 231 is covered with the cover pad 232 and the top cover member 233. Hereinafter, the combination of the pad 231 and the cover pad 232 is described as a "seat pad 234".

There is a plurality of air holes 233a formed in the surface of the top cover member 233, and as shown in FIG. 16, each air hole 233a is connected to the air outlet 261C on the surface of the duct 260C. As shown in FIG. 16, a tubular insert member 235 is embedded inside each of the plurality of air holes 233a.

Figure 17:
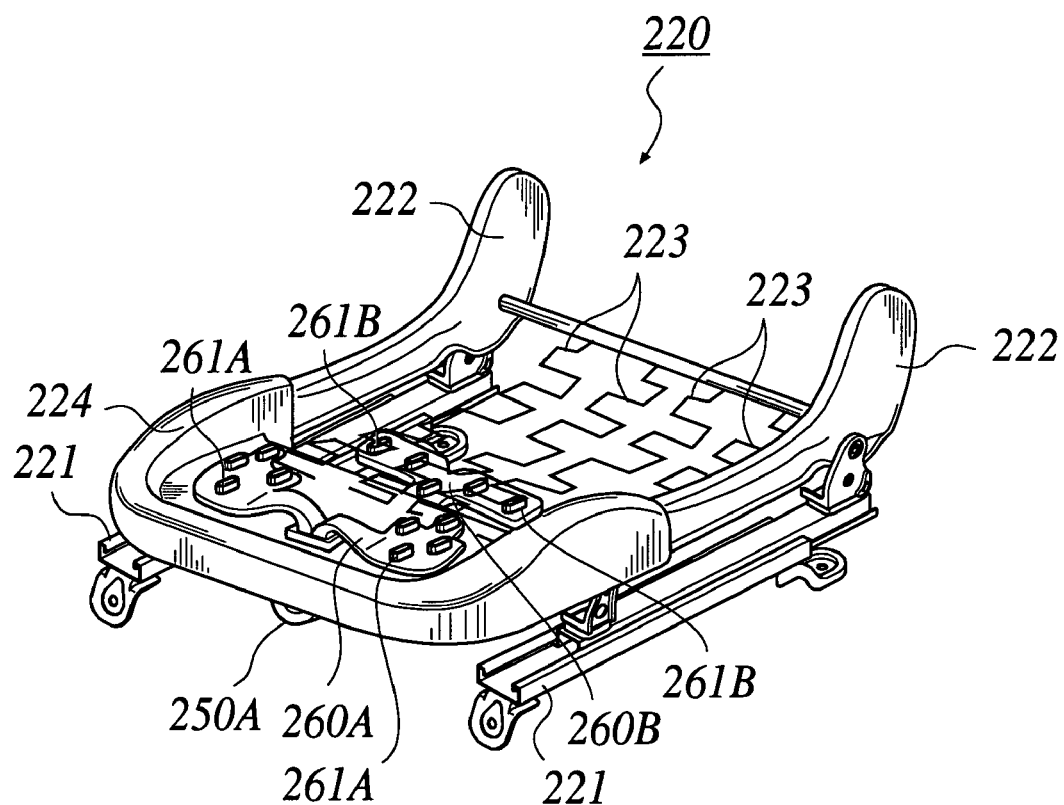
FIG. 17 is a perspective view showing a framework structure of the seat cushion side of the vehicle seat.
Figure 17:
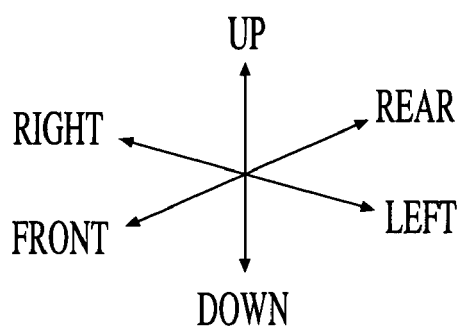
Figure 18:
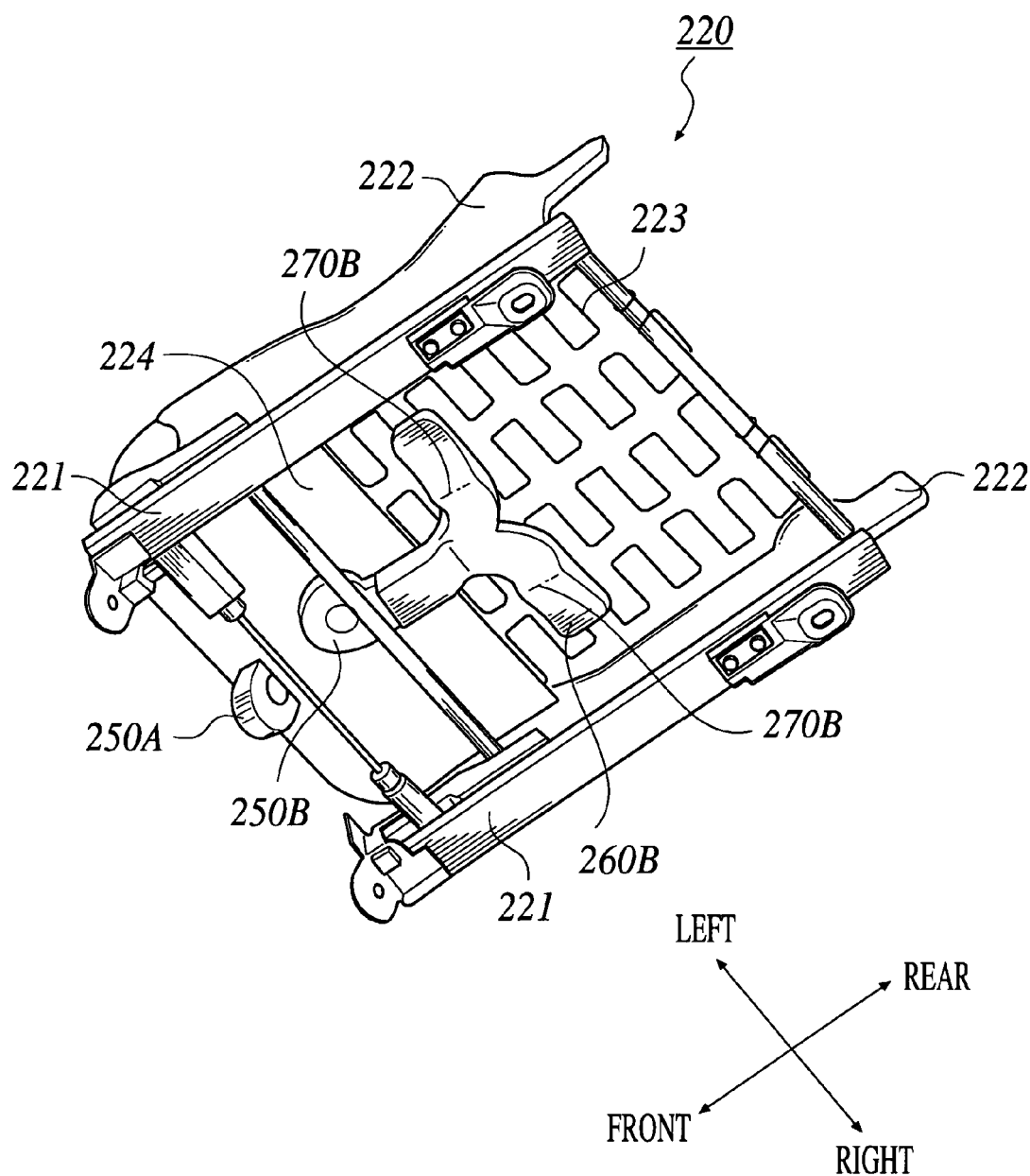
FIG. 18 is a perspective view showing the framework structure of the seat cushion side of the vehicle seat.

FIG. 17 is a perspective view showing a framework structure of the seat cushion 220 side of the vehicle seat 210, and FIG. 18 is a perspective view of the framework structure as seen from the lower surface side.

The framework structure of the seat cushion 220 side is schematically configured to comprise a pair of right and left seat rails 221, a pair of right and left seat frames 222 attached to the seat rails 121, seat springs 223, a pan frame 224 which is crossed over the seat springs 223 and the front portions of the seat frames 222, and the like.

As shown in FIG. 18, air blowers 250A and 250B for the seat cushion 220 are attached to the front and center of the lower surface of the pan frame 224, respectively.

Figure 19:
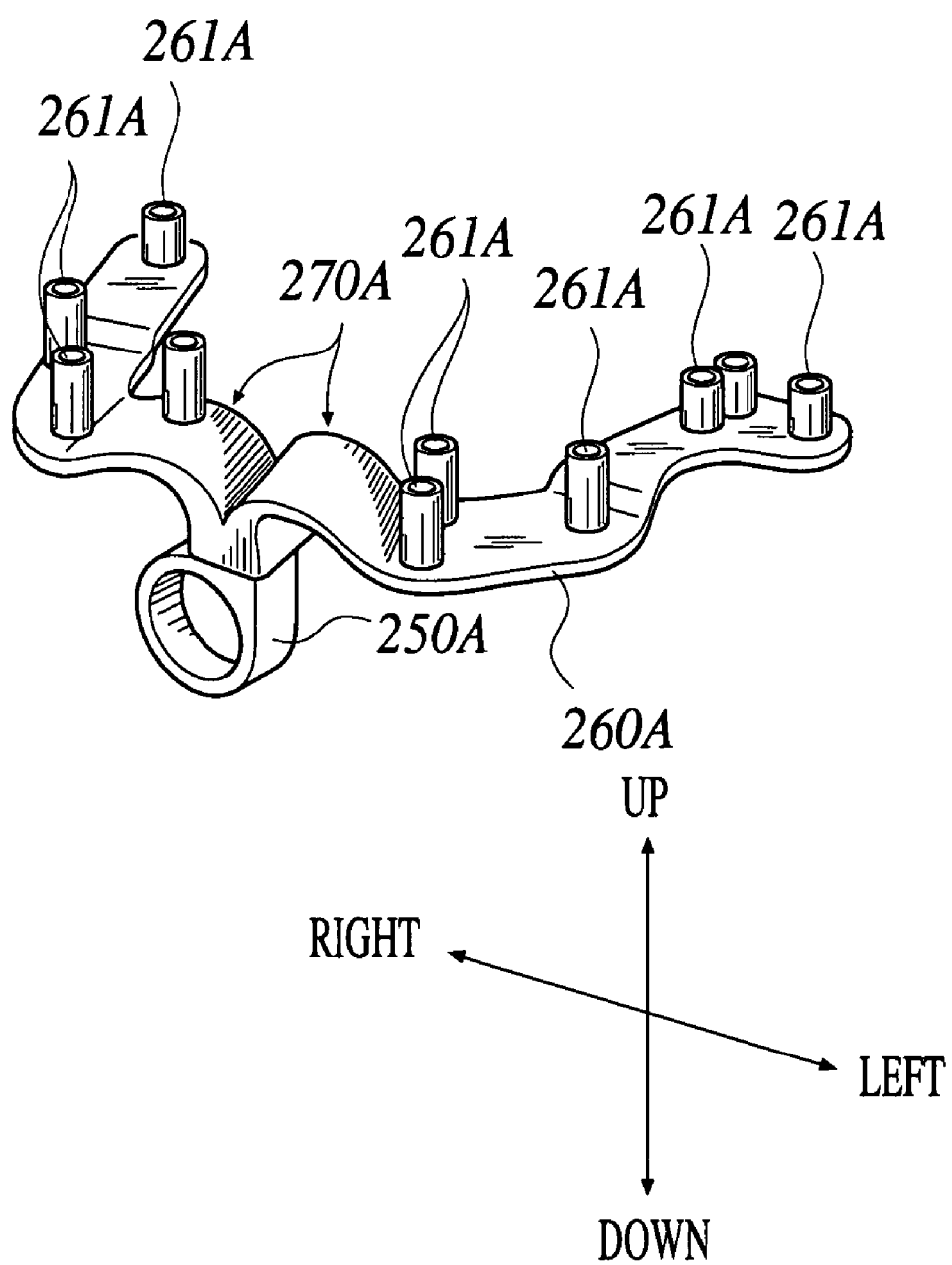
FIG. 19 is a front view showing a duct shape on the seat cushion side of the vehicle seat.

A duct 260A connected to the air blow hole of the front air blower 250A passes the opening provided in the pan frame 224 to reach the upper surface of the pan frame 224 and branches off in right and left direction. Also, as shown in FIG. 19, the duct 260A is provided with a bending portion 270A bending in the upper side with respect to the horizontal direction at a portion thereof, and the duct 260A extends backward on the upper surface of the pan frame 224 from the bending portion 270A.

A duct 260B connected to the air blow hole of the central (back) air blower 250B extends backward on the lower surface side of the pan frame 224, and branches into right and left direction. Also, as shown in FIG. 18, the duct 260B is provided with a bending portion 270B bending in the lower side with respect to the horizontal direction at a portion thereof.

A plurality of tubular air outlets 261A, 261B are provided to project upward at the positions on the upper surface of the ducts 260A, 260B corresponding to the plurality of air holes 133a, respectively.

Figure 20:
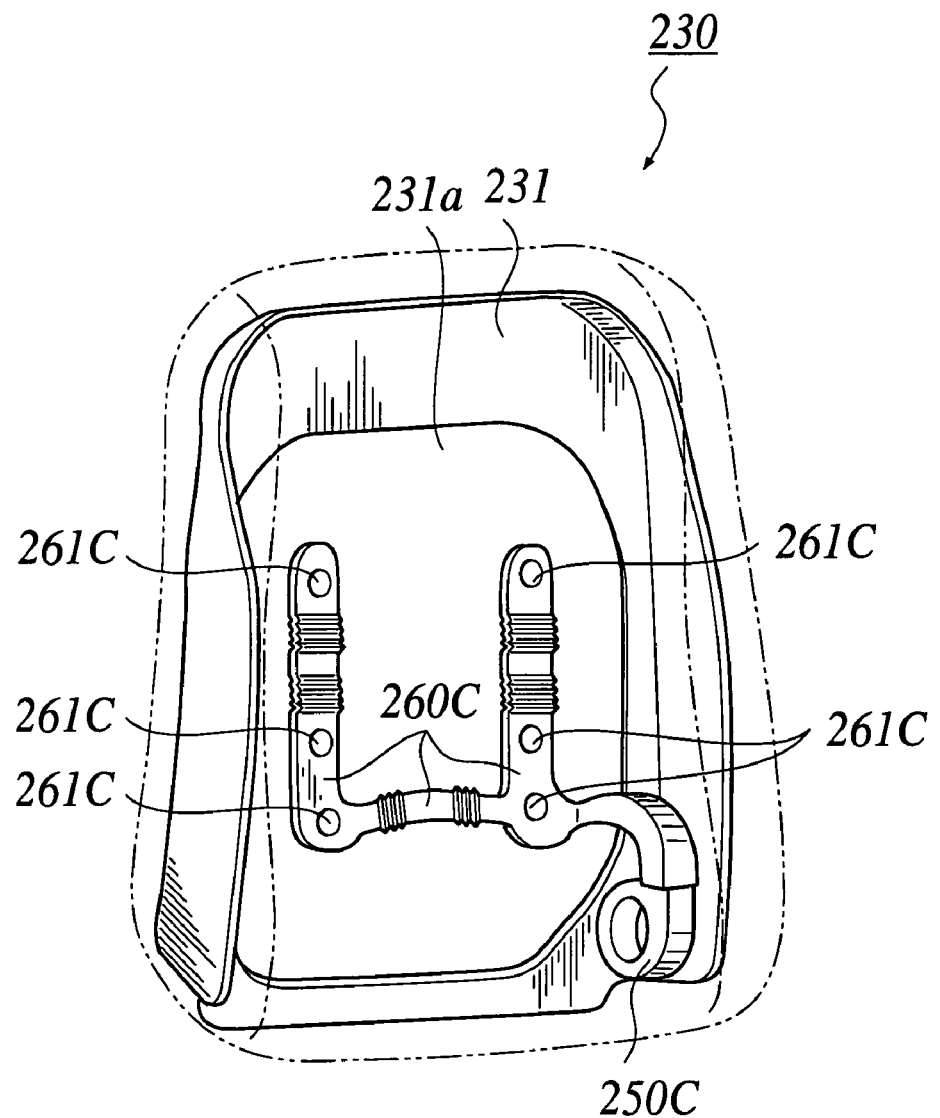
FIG. 20 is a perspective view showing a framework structure of the seat back side of the vehicle seat.
Figure 20:
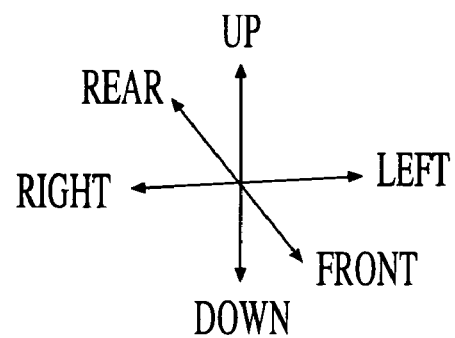

FIG. 20 is a back view of the seat back 230, and the seat back 230 is schematically configured to comprise a sub seat frame 231 having an opening 231a in the center, a seat spring (omitted from the drawings) attached to the sub seat frame 231 and the like.

An air blower 250C for the seat back is attached to one of the right and left lower sides of the back surface of the sub seat frame 231.

Figure 21:
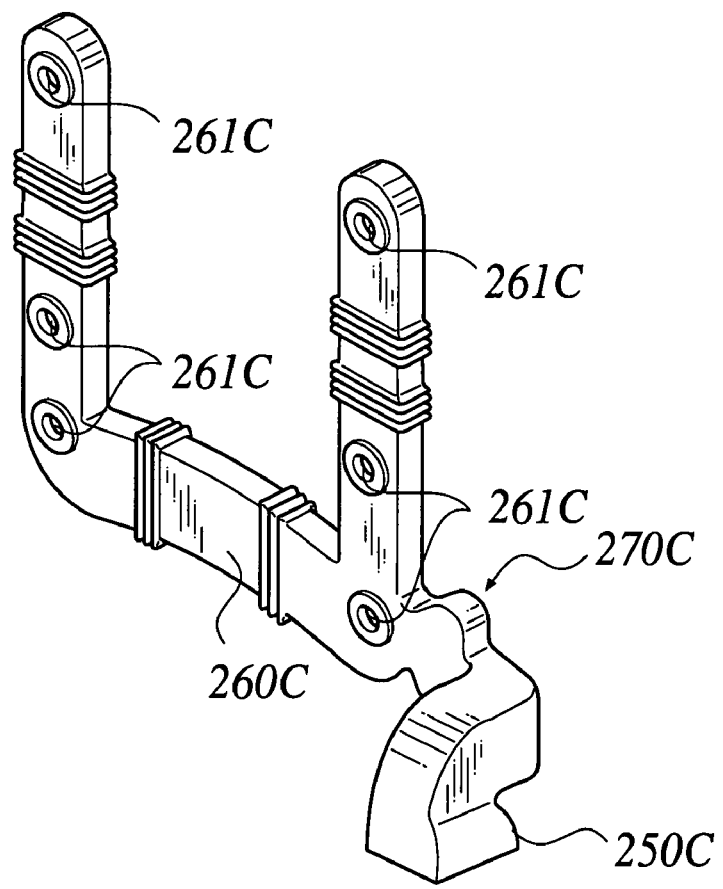
FIG. 21 is a front view showing the duct shape on the seat back side of the vehicle seat.
Figure 21:
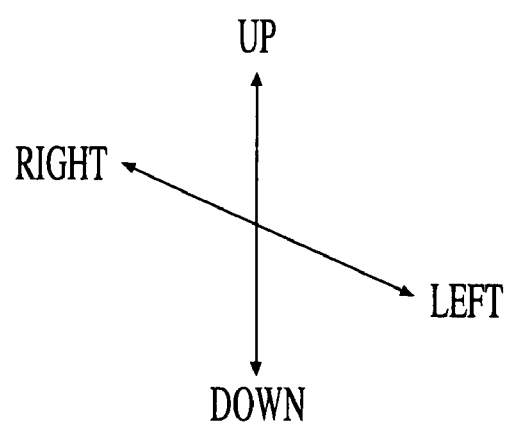

As shown in FIG. 21, a duct 260C connected to the air blow hole of the air blower 250C is provided with the bending portion 270 bending in the upper side with respect to the horizontal direction, and extends upward from the right and left two positions in the opening 231a of the sub seat frame 31.

At the positions corresponding to the plurality of air holes 233a on the front surface of the duct 260C, similar to the above seat cushion 220 side, a plurality of tubular air outlets 261C are provided to project upward.

The air outlets 261A, 261B, 261C of the seat cushion 220 side and the seat back 230 side engage the insides of the air holes 233a of the seat cushion 220 side and the seat back 230 side, respectively.

As above, according to the vehicle seat 210 of the embodiment, a portion of each of the ducts 260A, 260C in the state of being attached to the front of the seat cushion 220 side and the seat back 230 side bends upward with respect to the horizontal direction, so that, for example, when a passenger spills liquid such as a drink or the like on the seat cushion 220 or the seat back 230, the liquid entered from the air holes 233a into the ducts 260A, 260C is prevented from flowing at the bending portions 270A, 270C at which the ducts 260A, 260C are bent upward. Thus, the situation of the air blower failure due to the liquid reached to the air blowers 250A, 250B can be prevented from occurring.

Moreover, according to the vehicle seat 210 of the embodiment, a portion of the duct 260B in the state of being attached to the center (back) of the seat cushion 220 side bends downward with respect to the horizontal direction, so that, for example, when a passenger spills liquid such as a drink or the like on the seat cushion 220 or the seat back 230, the liquid entered from the air holes 233a into the duct 260B stays in the bending portion 270B at which the duct 260B is bent downward. Thus, the situation of the air blower failure due to the liquid reached to the air blower 250B can be prevented from occurring.

The present invention is not limited to the above embodiments, and various improvements and design changes may be made without departing from the scope of the invention.

As above, the vehicle seat according to the present invention is useful as a seat mounted on the vehicle such as an automobile or the like, especially, the vehicle seat is suitable as a seat to give comfortable feeling to a passenger when the passenger sit in.

The entire disclosure of Japanese Patent Application Nos. Tokugan 2004-102527 which was filed on Mar. 31, 2004, Tokugan 2004-102594 which was filed on Mar. 31, 2004, Tokugan 2004-102601 which was filed on Mar. 31, 2004, Tokugan 2004-102620 which was filed on Mar. 31, 2004, and Tokugan 2004-102639 which was filed on Mar. 31, 2004, including specification, claims, drawings and summary are incorporated herein by reference in its entirety.

What is claimed is:

1. A vehicle seat comprising:
   a seat cushion and a seat back formed by covering a surface of a seat pad with a top cover member;
   a plurality of air holes which penetrate the seat pad to reach a surface of the top cover member;
   a plurality of air outlets which project from a surface of a duct to be connected to the air holes; and
   an air blower to pressure and feed air inside a vehicle compartment to the air holes through the duct and the air outlets,
   wherein a portion of the duct attached to the seat cushion side and the seat back side bends upward or downward with respect to a horizontal direction and is configured to prevent liquid that enters the duct through any of the air holes from flowing at the portion at which the duct is bent.

2. The vehicle seat according to claim 1, further comprising an insert member which has a tubular shape and is embedded inside one of the air holes,
   wherein one of the air outlets is inserted into the insert member to be engaged therewith.

3. The vehicle seat according to claim 2, wherein the insert member is integrally formed with the seat pad.

4. The vehicle seat according to claim 1, the duct has a bellows structure at least at one position thereof.

5. The vehicle seat according to claim 1, wherein the duct attached to the seat cushion side bends upward and downward with respect to a horizontal direction and is configured such that liquid that enters the duct liquid stays at the portion at which the duct is bent downward.

* * * * *